(12) United States Patent
Stratico et al.

(10) Patent No.: US 7,434,759 B2
(45) Date of Patent: Oct. 14, 2008

(54) MULTIPLE WIRE WINDING

(75) Inventors: Gianfranco Stratico, Siena (IT); Antonio Lumini, Florence (IT)

(73) Assignee: ATOP S.p.A., Barberino Val d'Elsa (IT)

( * ) Notice: Subject to any disclaimer, the term of this patent is extended or adjusted under 35 U.S.C. 154(b) by 0 days.

(21) Appl. No.: 11/386,448

(22) Filed: Mar. 21, 2006

(65) Prior Publication Data

US 2006/0273214 A1 Dec. 7, 2006

Related U.S. Application Data

(63) Continuation of application No. 10/732,338, filed on Dec. 9, 2003, now abandoned.

(60) Provisional application No. 60/432,392, filed on Dec. 9, 2002.

(51) Int. Cl.
*H02K 15/085* (2006.01)

(52) U.S. Cl. .................................... 242/432.4; 29/596

(58) Field of Classification Search ... 242/432.2–432.5, 242/444, 444.2, 444.3, 445.1, 434.1; 29/596
See application file for complete search history.

(56) References Cited

U.S. PATENT DOCUMENTS

| | | | |
|---|---|---|---|
| 5,622,332 A | 4/1997 | Bennitt et al. | |
| 5,964,429 A | 10/1999 | Burch et al. | |
| 6,003,805 A | 12/1999 | Newman | |
| 6,254,027 B1 | 7/2001 | Kunou | |
| 6,533,208 B1 | 3/2003 | Becherucci et al. | |
| 6,622,954 B2 | 9/2003 | Komuro et al. | |
| 6,622,955 B2 * | 9/2003 | Stratico et al. | ........... 242/432.4 |
| 6,745,972 B2 | 6/2004 | Takano et al. | |
| 2002/0088892 A1 | 7/2002 | Komuro et al. | |

FOREIGN PATENT DOCUMENTS

| | | |
|---|---|---|
| CH | 456754 | 7/1968 |
| EP | 1282217 | 2/2003 |
| JP | 02262861 | 10/1990 |

* cited by examiner

*Primary Examiner*—Evan H Langdon
(74) *Attorney, Agent, or Firm*—Ropes & Gray LLP

(57) ABSTRACT

The present invention concerns forming wire coils by simultaneously winding a plurality of wires onto a dynamo-electric machine component. In order to maximize the amount of wire that can be placed in the spacings of the dynamo-electric machine component, the turns of the wire coil must be regularly disposed without twisting the plurality of wires onto each other. Current winding apparatus may allow certain portions of the wire turns to unevenly accumulate and locally bulge outward from the collection of wire coils. Such bulges, especially in consideration of the limited spacings available on an dynamo-electric machine component, may interfere with or access to the spacings by a wire dispensing member during the winding process. The present invention proposes to perform multiple-wire winding processes that avoid wire twisting and improper disposition of the wires. Further, the present invention proposes to improve the ability of the wire dispensing member to traverse the spacings on the component. As a consequence, the winding processes performed with the present invention are less likely to be hindered by interference and are capable of obtaining more wire fill within the component spacings and higher winding speeds.

15 Claims, 4 Drawing Sheets

MULTIPLE WIRE WINDING

CROSS REFERENCE TO RELATED APPLICATION

This application is a continuation of U.S. patent application Ser. No. 10/732,338, filed Dec. 9, 2003, which claims the benefit of priority from U.S. provisional patent application No. 60/432,392, filed Dec. 9, 2002, both of which are hereby incorporated by reference herein in their entireties.

BACKGROUND OF THE INVENTION

The present invention concerns solutions for winding coils of wire onto dynamo-electric machine components. In particular, the present invention concerns forming wire coils by simultaneously winding a plurality of wires onto the dynamo-electric machine component. For example, wire coils may be wound onto the poles of a lamination core or may be wound onto themselves in components that do not require or possess poles.

These wire coils have the purpose of generating the electromagnetic field needed in the final application of the dynamo-electric machine component. For example, the previously mentioned lamination core may be either a stator core or an armature core of a dynamo-electric machine. The dynamo-electric machine as a whole may be an electric motor, which is used for many types of driving applications.

In order to maximize the amount of wire that can be placed in the spacings of the dynamo-electric machine component, the turns of the wire coil must be regularly disposed (e.g., along the sides of the pole pieces) without twisting the plurality of wires onto each other. Further, the wires must be placed so that the wire turns are positioned in an ascending or descending layer formation (commonly referred to in the art and hereinafter as "stratification").

Current winding apparatus may allow certain portions of the wire turns to unevenly accumulate and locally bulge outward from the side of the collection of wire coils. Such bulges, especially in consideration of the limited spacings available on an dynamo-electric machine component, may interfere with or impede access through the limited component spacings during the wire winding process.

This situation is even more severe when the winding process requires the simultaneous winding of a plurality of wires to form a single wire coil, especially when the wire dispensing member must pass through the spacings on the dynamo-electric machine component to wind the multiple wires. As a result of the requirement for multiple wires, bulges are more likely to be caused by twisting of the multiple wires and may interfere with the movement of the wire dispensing member within the component spacings.

The present invention proposes to perform multiple-wire winding processes that avoid wire twisting and improper disposition of the wires. Further, the present invention proposes to improve the ability of the wire dispensing member to traverse the spacings on the dynamo-electric machine component. As a consequence, the winding processes performed with the present invention are less likely to be hindered by interference and are capable of obtaining more wire fill within the component spacings and higher winding speeds.

These and other objects of the present invention will be more apparent in view of the following drawings and detailed description of the preferred embodiments.

BRIEF DESCRIPTION OF THE DRAWINGS

Non-limiting embodiments of the present invention are described hereinafter with reference to the accompanying drawings in which.

DETAILED DESCRIPTION OF THE PREFERRED EMBODIMENTS

The solutions of the present application are generally related to those described in commonly assigned Stratico et al. U.S. Pat. No. 6,622,955 which is incorporated by reference herein in its entirety.

Figure 1:
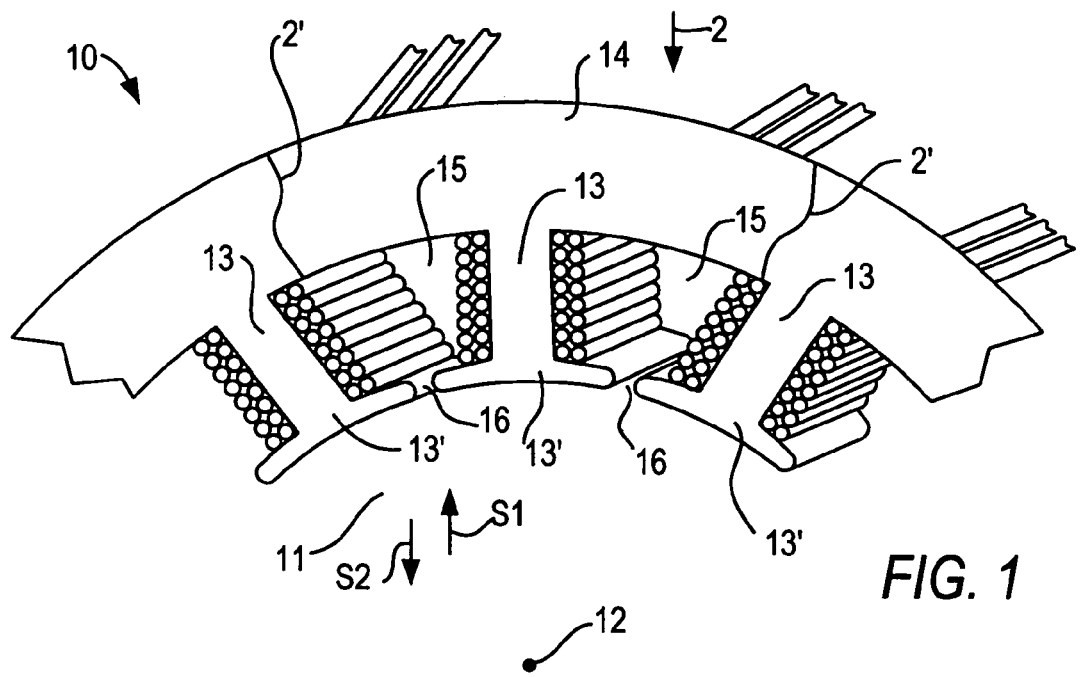
FIG. 1 is an elevational partial view of a wound stator core as seen from an axial end thereof.

With reference to FIG. 1, stator core 10 has hollow cylindrical interior 11 centered on longitudinal axis 12. Interior 11 is delimited externally by pole pieces 13, which stem from annular portion 14 of the stator core. Expansions 13' of pole pieces 13 are usually the innermost portions of stator core 10 and delimit the spacing of interior 11. Gaps 16 existing between adjacent expansions 13' are access passages which allow communication between interior 11 and slot spacings 15. In the case of the stator core shown, gaps 16 and slot spacings 15 are inclined by a predetermined angle with respect to central axis 12.

Modern stator cores need to be compact in size. At the same time, the stator cores must maintain a significant quantity of ferromagnetic material and therefore a high wire presence within slot spacings 15. As a result, gaps 16 are narrower and spacings 15 are even more full of wire as compared to prior stator cores. In addition, the electrical scheme of the stator cores is usually such that each coil C is wound around a single pole, like one of pole pieces 13 shown in FIG. 1. With reference to FIG. 1, coils C have been shown sectioned. For sake of clarity, portions of coils C which are outside the stator core have not been shown.

The embodiment which is illustrated in the present application is directed toward the simultaneous winding of three wires around the poles of a stator core. However, it should be understood that any number of wires may be simultaneously wound in accordance with the present invention. It should also be understood that although the following description concentrates on an embodiment in which the wire coils are wound around a single pole, the present invention may be used to wind a wire coil through multiple poles. Similarly, the present invention may be used to wind wire coils around virtual poles in which no physical pole exists on the stator core. In the case of a virtual pole, wire coils are wound around each other about a theoretical pole axis on the stator. This type of stator may allow even more wire coils to be placed within a set amount of space in the core and are fully contemplated by the present invention.

Figure 2:
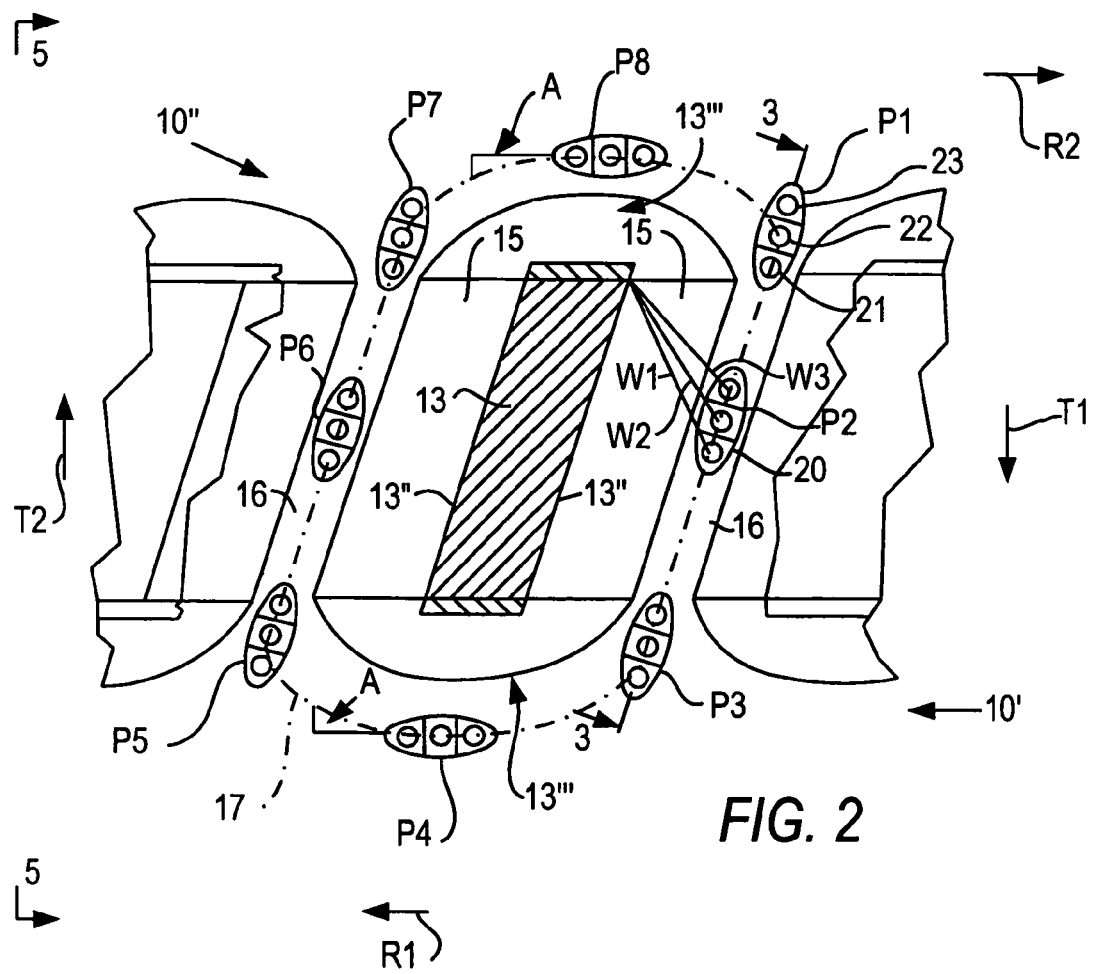
FIG. 2 is a partial sectional view of the stator core showing certain parts of the apparatus of the present invention as seen from direction 2 of FIG. 1.

With reference to FIG. 2, wire nozzle 20 is shown in various relative consecutive positions P1-P8, which the wire nozzle occupy when moving around pole piece 13 to simultaneously dispense wires W1, W2, and W3. More particularly, by relative movements of wire nozzle 20 around pole piece 13, wires W1, W2, and W3 are simultaneously dispensed from respective wire exits 21, 22, and 23 of wire nozzle 20 to become tensioned against pole piece 13.

Positioning of wire nozzle 20 in positions P1-P8 can be achieved by relative movements between stator core 10 and wire nozzle 20. For example, stator core 10 and wire nozzle 20 can be rotated with relative rotation R1 when wire nozzle 20 is beyond end 10' of stator core 10. Oppositely, relative rotation R2 may be provided when wire nozzle 20 is beyond end 10" of stator core 10. Rotations R1 and R2 are both substantially about central axis 12 of stator core 10.

Between these rotations, and even during the rotations, stator core 10 and wire nozzle 20 may be relatively translated in directions T1 and T2, which are substantially parallel to central axis 12 of stator core 10. For sake of clarity, FIG. 2 does not show the various positions of the stator core 10 as it is moved with relation to a stationary wire nozzle 20. Instead, FIG. 2 shows the positions of wire nozzle 20 in the first plane (the plane of FIG. 2) as it accomplishes relative translations T1 and T2 and relative rotations R1 and R2 while stator core 10 is stationary. However, it should be understood that rotations R1 and R2 and translations T1 and T2 are strictly relative between wire nozzle 20 and stator 10. Either nozzle 20 or stator 10 may be moved in order to accomplish this relative movement. It will also be useful in the following to define an instantaneous relative trajectory (or direction of movement) of wire nozzle 20 with respect to the relative movement between nozzle 20 and stator core 10. This instantaneous relative trajectory (or direction of movement) of wire nozzle 20 should be understood to be the instantaneous direction of movement of wire nozzle 20, as a result of the relative movement between nozzle 20 and stator 10, seen from a frame of reference in which stator 10 is held fixed.

It should be understood that rotations R1 and R2 may be sequenced and combined with translations T1 and T2 to accomplishes closed path 17 of wire nozzle 20 around pole piece 13. A single closed path 17 may wind one turn of wire coil C with wires W1, W2, and W3 around pole 13. A cumulative and predetermined number of closed paths like 17 (accomplished progressively) achieves winding of the number of turns required by coil C. As will be more fully described in the following, wire nozzle 20 and stator 10 is also provided with relative radial motions S1 and S2, which are substantially parallel to pole piece sides 13" (and substantially perpendicular to central axis 12) in order to accomplish the previously described wire stratification. The stratification formation requires accomplishing closed paths like 17 on a number of adjacent parallel planes that are parallel to the first plane (the plane of FIG. 2). In other words, the multiple wires are dispensed on adjacent planes that are parallel to each other and which are substantially perpendicular to radii that perpendicularly emanate from central axis 12.

With reference to FIG. 2, position P1 shows wire nozzle 20 when it is just about to start traversing a longitudinal extension of gap 16. In order to accomplish the necessary stroke to traverse the longitudinal extension, translation T1 is combined with rotation R1 to accommodate the angle of incline of the longitudinal extension with respect to central axis 12. Position P2 shows wire nozzle 20 during the previously described stroke. Position P3 shows wire nozzle 20 when the previously described stroke is just about to end. Position P4 shows wire nozzle 20 when a rotation R1 is occurring. Position P5 shows wire nozzle 20 when rotation R1 is about to end and an opposite stroke to traverse the opposite extension of gap 16 is just about to start. Position P6 shows wire nozzle 20 during the return stroke to traverse the opposite extension of gap 16 which includes translation T2 and rotation R2. Position P7 shows wire nozzle 20 when the return stroke is just about to end. Position P8 shows wire nozzle 20 when a rotation R2 is occurring. It should be understood that the relative movement from P3 to P5 and from P7 to P1 may include movements in addition to rotations R1 and R2, respectively. For example, translations T1 and T2 and stratification motions S1 and S2 may be programmed during those strokes to dispose wires W1, W2, and W3 in a tensioned manner against ends 13''' of pole piece 13. Similarly, the traversing strokes from position P1 to P3 and from position P5 to P7 may also be further programmed to include stratification motions S1 and S2.

As shown in FIG. 2, wire nozzle 20 needs to be in a particular orientation with respect to gap 16 during the traversing stroke to dispense wires W1, W2 and W3 within slot spacing 15 in a tensioned manner against the sides of pole piece 13 without twisting or overlap of the wires. In addition, it should be understood that wire nozzle 20 must occupy a portion of gap 16 during each of the traversing strokes (see FIG. 3) so that it is partially inserted into spacing 15. As previously described, in order to cope with the incline of gap 16 and spacing 15 with respect to central axis 12 of the stator core, portions of rotations R1 and R2 need to be combined with translations T1 and T2 so that wire nozzle 20 moves within gaps 16 without collision with the borders of expansions 13'.

To avoid twisting wires W1, W2 and W3 during translations and rotations T1, T2, R1, and R2, wire nozzle 20 needs to be oriented differently depending on the relative position which it occupies around pole piece 13 (i.e., the position of nozzle 20 on closed path 17). In other words, wire nozzle 20 needs to be steered or programmably controlled during translations and rotations T1, T2, R1, and R2 to appropriately orient wire exits 21, 22, and 23 and to reduce the necessary size of gaps 16.

Figure 3:
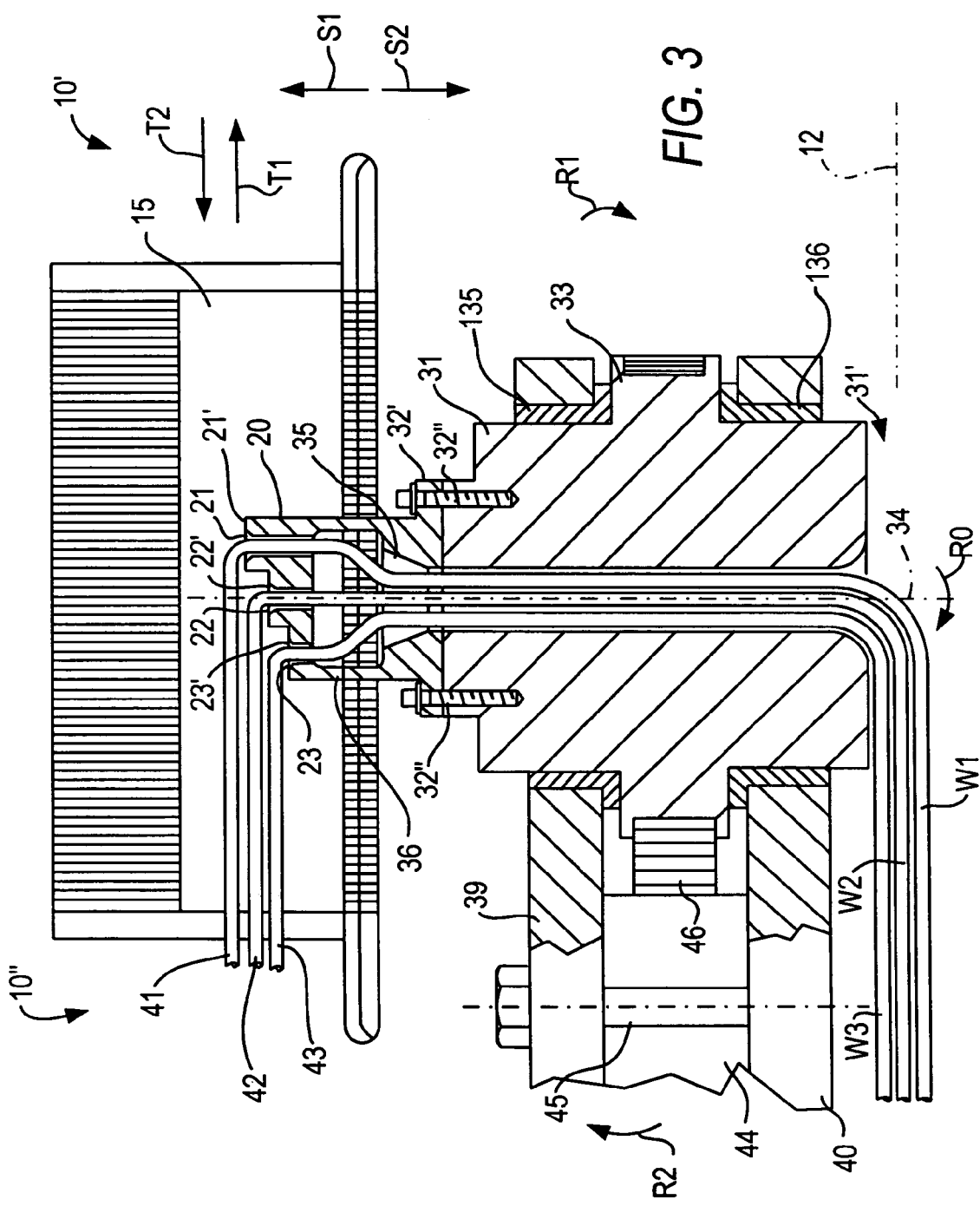
FIG. 3 is a partial sectional view of the apparatus taken from line 3-3 of FIG. 2.

With reference to FIGS. 2 and 3, and considering that wire nozzle 20 is traveling on closed path 17 with either a clockwise or counterclockwise direction around pole piece 13 (in the case of FIG. 2, wire nozzle 20 is accomplishing closed path 17 in a clockwise direction), steering of wire nozzle 20 around central axis 34 of the wire nozzle keeps wire exit 21 (or a front portion of the wire nozzle) always at the forward end of wire nozzle 20 in the relative direction of movement of wire nozzle 20 along the closed path 17. This avoids twisting of wires W1, W2 and W3 during winding. As will be more fully explained in the following, steering of wire nozzle 20 around axis 34 requires causing wire nozzle 20 to perform predetermined rotations R0 around axis 34 so that wire nozzle 20 can be appropriately oriented around axis 34 as it travels on closed path 17.

With reference to FIG. 3, wire nozzle 20 is connected to the top of shaft 31 by means of flange portion 32'. Flange portion 32' is bolted to the top of shaft 31 by means of screws 32". Shaft 31 is also provided with a pulley portion 33 engaged by belt 46. Shaft 31 is supported for rotation around axis 34 using support bushings 35 and 36 seated in support plates 39 and 40, respectively. Support plates 39 and 40 are distanced from each other by means of upright plate 44. Support plates 39 and 40 and upright plate 44 can be joined to form a single arm structure, as shown in FIG. 3, by means of bolts like 45. Belt 46 can circle around upright plate 44.

By driving belt 46, wire nozzle 20 can be provided with rotation R0 around axis 34 to achieve the appropriate orientations. Shaft 31 is hollow and flared in end 31' for smooth passage of wires W1, W2 and W3. Wire nozzle 20 is provided with a lower bore 35 for passage of wires W1, W2, W3 from shaft 31 to wire nozzle 20. Lower bore 35 communicates with an enlarged hollow portion 36 of wire nozzle 20 where wires W1, W2 and W3 separate to reach their respective wire exits 21, 22, 23.

Wire exits 21, 22, and 23 are on separate surfaces 21', 22', 23' of wire nozzle 20 which may also be understood to demark separate adjacent parallel planes. Each of these adjacent parallel planes is substantially perpendicular to central axis 34 of wire nozzle 20 and substantially parallel to the first plane. In this way, wires W1, W2 and W3 can be dispensed from wire nozzle 20 along separate courses like 41, 42 and 43, respectively. Dispensing of the wires along these different courses is another feature for avoiding twisting of wires W1, W2, and W3 during any relative movements of wire nozzle 20 with respect to the stator core 10.

Furthermore, wire exits 21, 22, and 23 may be maintained in predetermined orientations around axis 34 as wire nozzle 20 travels along closed path 17. In other words, wire nozzle 20 is steered or programmably controlled by maintaining the orientation of an axis in the first plane that is aligned with the wire exits with respect to an instantaneous relative direction of movement of nozzle 20. The angle between this wire exit axis in the first plane and the instantaneous relative direction of movement being defined as angle A. Particularly, the angular orientation of the wire nozzle (around axis 34) and therefore the orientation of the wire exit axis is programmably controlled to vary as nozzle 20 travels along closed path 17. Therefore, angle A may be constant in certain portions of the closed path (e.g., during the traversing strokes) and variable in other portions (e.g., during rotations R1 and R2). The configuration of the external surface (formed by sides 13" and ends 13''') of pole piece 13 may determine the choice of angle A. For example, a circular configuration of the ends of pole piece 13 may require a variation of angle A so that the wire exit axis in the first plane containing wire exits 21, 22, and 23 is maintained substantially tangent to the circular configuration of the exterior contour of ends 13'''.

Further, in the embodiment of the wire nozzle shown in FIG. 2 in which wire nozzle 20 has a length and a width, it may be understood that the angular orientation of wire nozzle 20 about axis 34 is programmably controlled so as to minimalize a cross sectional area of the wire nozzle with respect to the instantaneous relative direction of movement of wire nozzle 20 (i.e., by orienting the length of wire nozzle 20 with the direction of movement). The previously mentioned cross sectional area of wire nozzle 20 being taken across a plane that is substantially perpendicular to the instantaneous relative direction of movement of wire nozzle 20 in the first plane of FIG. 2. Such a scheme of orienting wire nozzle 20 may be especially useful during the traversing strokes to minimize the required size of gaps 16 and reduce the likelihood of collision or interference with wires already wound within spacings 15. Such an orientation may also be understood as an alignment of the wire exit axis with the instantaneous relative direction of movement of wire nozzle 20 such that angle A is zero.

Figure 4:
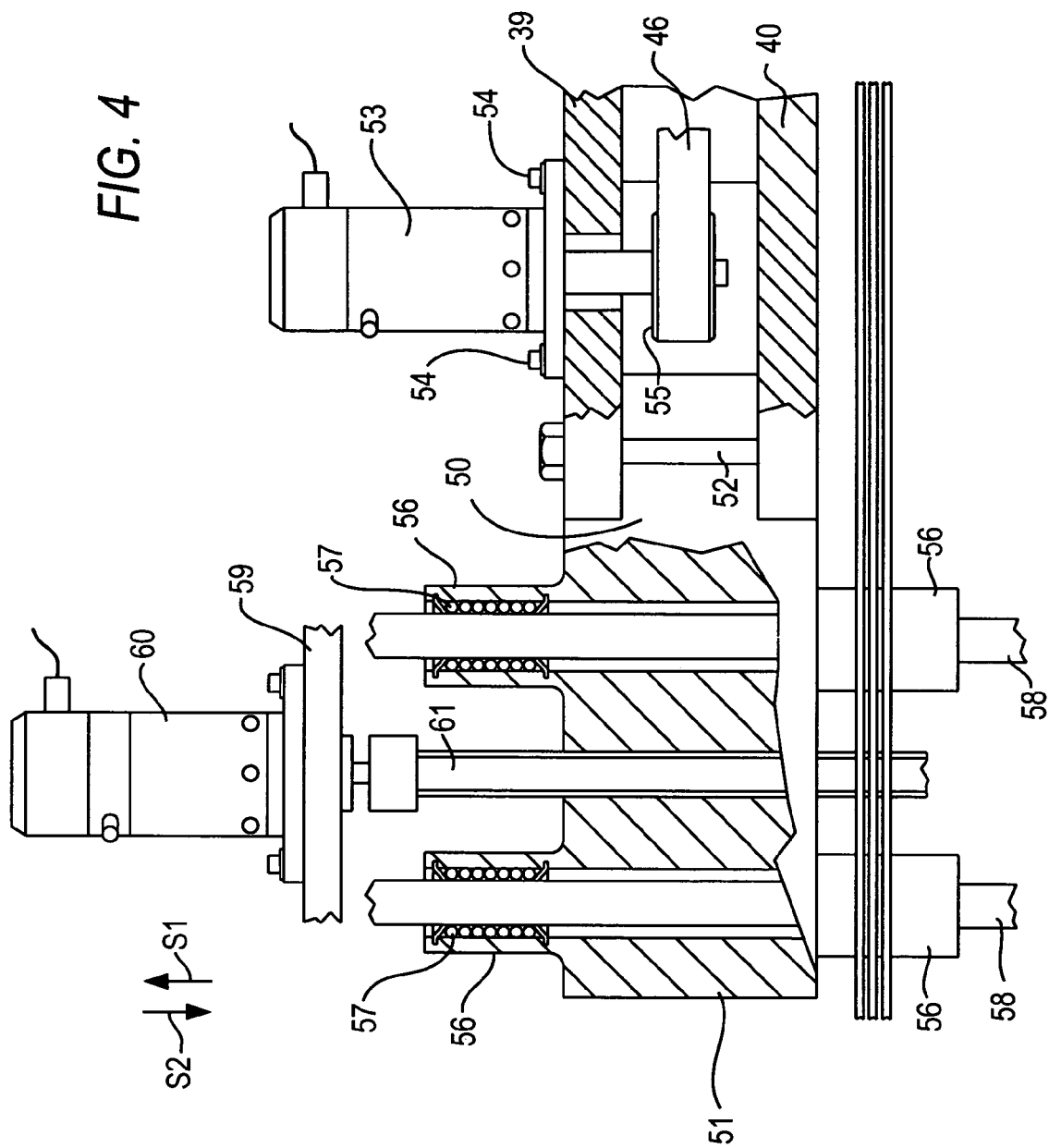
FIG. 4 is a partial sectional view similar to FIG. 3 that shows the apparatus of the present invention disposed to the left of the apparatus shown in FIG. 3.
Figure 5:
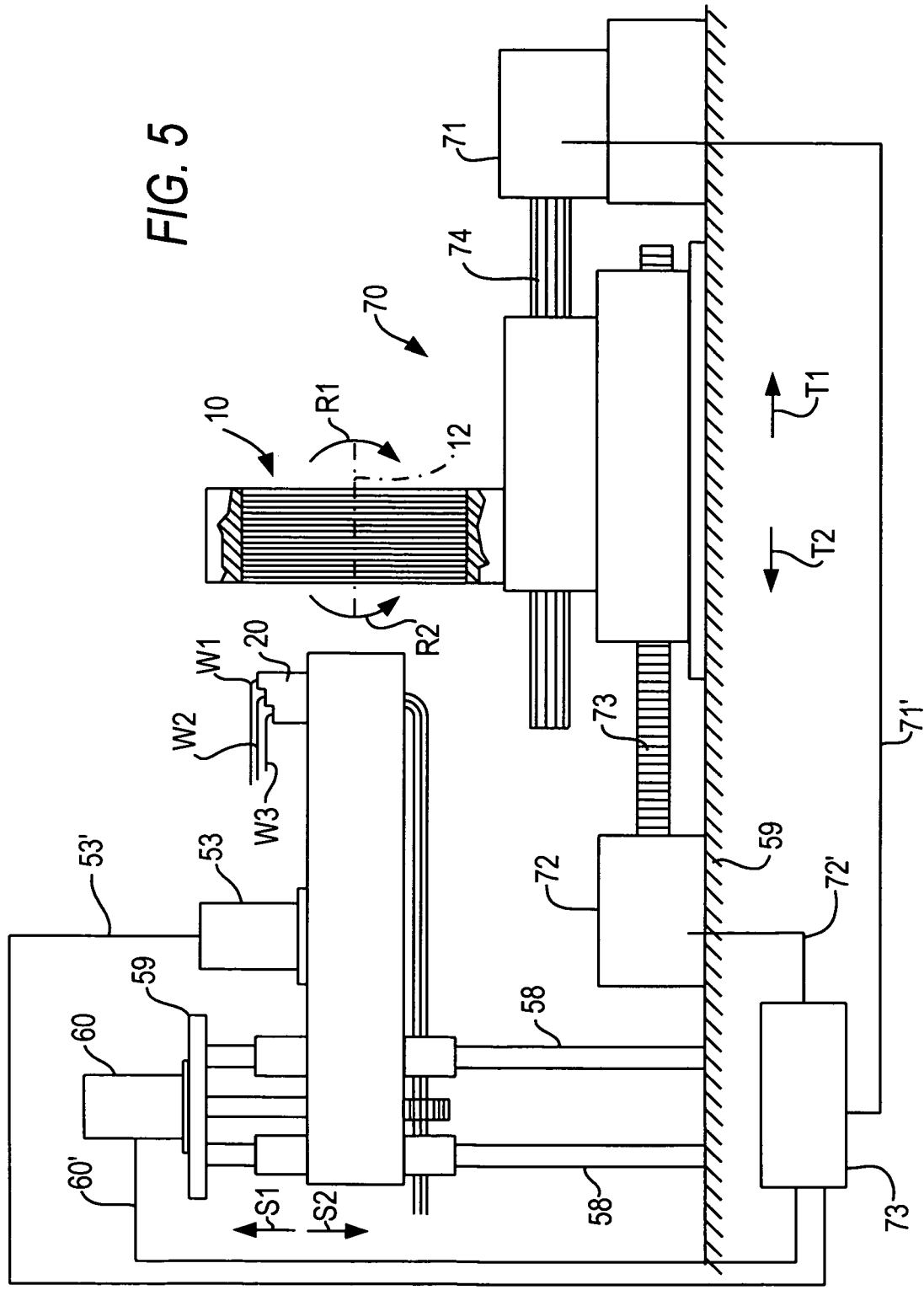
FIG. 5 is a schematic view showing the overall apparatus of the invention as seen from view lines 5-5 of FIG. 2.

With reference to FIG. 4, plates 39 and 40 are joined to appendix 50 of carriage structure 51 by means of bolts like 52. Motor unit 53 can be supported by plate 39 and fastened to it with bolts 54. Pulley wheel 55 is assembled to the output shaft of motor unit 53. Pulley wheel 55 is engaged by belt 46 so that rotation of the motor unit causes rotations RO of wire nozzle 20 around axis 34. Carriage structure 51 is provided with further appendixes 56. Each of appendixes 56 have slide portions 57 that are able to run on guides 58. Guides 58 are supported by frame structure 59 (shown partially in FIGS. 4 and 5) in order to be substantially perpendicular to the planes in which translations T1 and T2 are accomplished. Motor unit 60 driving screw 61 (which is engaged in a threaded portion of carriage structure 51) is provided for causing carriage structure 51 to run along guides 58. Guides are also parallel to directions S1 or S2 used for the stratification motion of wire nozzle 20.

In other words, by actuating motor unit 60, plates 39 and 40 are able to run in directions S1 or S2 (i.e., parallel to guides 58) so that wire nozzle 20 can move in radial directions S1 or S2 to stratify wires W1, W2 and W3 along pole piece 13. During the relative movements of wire nozzle 20 and stator core 10, wires W1, W2, and W3 may run unimpeded to end 31' of shaft 31 from a wire source and tension unit (not shown) in order to be dispensed from the exits of wire nozzle 20. Positioning of the stator core 10 with respect to wire nozzle 20 can be achieved by means of assembly 70 shown in FIG. 5. More particularly, assembly 70 holds the stator core in a predetermined position with respect to frame structure 59.

Assembly 70 may be similar to the portion of apparatus shown in the previously incorporated Stratico et al. U.S. patent for rotating and indexing the stator core. Motor unit 71 and rotation bar 74 of assembly 70 are used for rotating the stator core for rotations R1 and R2. Rotation bar 74 bears a gear (not shown), which engages an annular gear (not shown) surrounding stator core 10 so that rotation of the rotation bar 74 rotates the annular gear and consequently stator core 10. Motor unit 72 and screw 73 of assembly 70 may be used to provide stator core 10 with translations T1 and T2. The aforementioned gear borne by rotation bar 74 has keyways which allow the gear to translate along rotation bar 74 to remain in engagement with the aforementioned annular gear during translations T1 and T2.

Motors units 53, 60, 71 and 72 may be actuated and controlled by control system 73 along signal and electric supply lines 53', 60', 71', and 72', respectively. Control system 73 is configured according to the latest available techniques for controlling and programming general motions and positioning with NC axes (numerical controlled axes).

Sequence and regulation algorithms using externally input data may be applied by control system 73 to actuate the motor units so that translations T1 and T2, rotations R1 and R2, stratification motions S1 and S2, and rotations RO are performed as operations which follow a sequential order, or in combination with each other. Precise synchronization between these movements may be guaranteed by control system 73. The values of these movements may be found through practical trials which involve winding the actual wires on representative models of the pole configurations. Furthermore, three-dimensional computer simulation of the wire nozzle and stator core motions with respect to the pole piece configuration, together with representations of the various wire extensions from the wire nozzle to the pole piece in the various instances of the motions, may be used to determine the initial values for the practical trials.

Thus, improved systems and methods for a wire nozzle that simultaneously winds multiple wires onto a dynamo-electric machine component while preventing wire twisting and reducing the needed gap spacing by controlling an orientation of the nozzle is provided. One skilled in the art will appreciate that the present invention can be practiced by other than the described embodiments, which are presented for the purpose of illustration and not of limitation.

What is claimed is:

1. Apparatus for winding wire onto a dynamo-electric machine component, the apparatus comprising:
   a wire nozzle configured to dispense a wire from a wire exit using relative movement between the component and the wire nozzle; wherein:
      the wire nozzle is disposed on a distal end of a support arm and provided with an angular orientation about an axis of the wire nozzle, the angular orientation being measured in a first plane that is parallel to the movement;
      the angular orientation is programmably controlled;
      the wire nozzle is driven to rotate around the axis of the wire nozzle to control the orientation of the wire nozzle; and
      the support arm is configured to rotate the wire nozzle around the axis of the wire nozzle and stratify the wire nozzle in a direction substantially parallel to the axis of the wire nozzle.

2. The method of claim 1, wherein the wire nozzle is further configured to simultaneously dispense a plurality of wires.

3. The apparatus of claim 2 wherein the wire nozzle is further configured to dispense the plurality of wires in a corresponding number of adjacent planes that are parallel to each other, wherein each of the wires is dispensed in one of the adjacent parallel planes.

4. The apparatus of claim 3 wherein the wire nozzle has a plurality of wire exits corresponding to the plurality of wires, wherein each of the wire exits is disposed on one of the adjacent parallel planes.

5. The apparatus of claim 4 wherein the angular orientation of the wire nozzle is programmably controlled to orient locations of the wire exits in the first plane with respect to an instantaneous relative direction of movement of the wire nozzle in the first plane, wherein a wire exit axis passing through the locations of the wire exits in the first plane is oriented with respect to the instantaneous relative direction of movement.

6. The apparatus of claim 1 wherein the angular orientation of the wire nozzle is programmably determined by an instantaneous location of the wire nozzle with respect to the component.

7. The apparatus of claim 1 wherein the wire nozzle is further configured for relative translation and rotation with respect to a central axis of the component.

8. The apparatus of claim 7 further comprising a component carriage on which the component is disposed, wherein the component carriage is configured to translate and rotate the component with respect to the central axis of the component.

9. The apparatus of claim 1 wherein the angular orientation of the wire nozzle is programmably controlled to minimize a cross sectional area of the wire nozzle taken across a second plane that is substantially perpendicular to an instantaneous relative direction of movement of the wire nozzle in the first plane.

10. The apparatus of claim 1 wherein a front portion of the wire nozzle leads the wire nozzle in an instantaneous relative direction of movement of the wire nozzle.

11. A method for winding wire onto a dynamo-electric machine component comprising:
   providing a wire nozzle configured to simultaneously dispense a plurality of wires from wire exits using relative movement between the component and the wire nozzle, wherein each of the wire exits is disposed on one of adjacent parallel planes;
   providing the wire nozzle with an angular orientation of the wire nozzle about an axis of the wire nozzle, the angular orientation being measured in a first plane that is parallel to the movement; and
   controlling the angular orientation of the wire nozzle by orienting a wire exit axis passing through locations of the wire exits in the first plane with respect to an instantaneous relative direction of movement of the wire nozzle in the first plane.

12. The method of claim 11 wherein controlling the angular orientation of the wire nozzle further comprises determining the angular orientation of the wire nozzle by an instantaneous location of the wire nozzle with respect to the component.

13. The method of claim 11 further comprising providing the wire nozzle with relative translation and rotation with respect to a central axis of the component.

14. The method of claim 11 wherein controlling the angular orientation of the wire nozzle further comprises minimizing a cross sectional area of the wire nozzle taken across a second plane that is substantially perpendicular to an instantaneous relative direction of movement of the wire nozzle in the first plane.

15. The method of claim 11 wherein controlling the angular orientation of the wire nozzle further comprises driving the wire nozzle for rotation around the central axis of the wire nozzle.

* * * * *